United States Patent [19]
Scheel et al.

[11] 3,801,392
[45] Apr. 2, 1974

[54] METHOD FOR INSULATING ELECTRICAL CONDUCTOR COMPONENTS OF AN ELECTRICAL APPARATUS UTILIZING MICA TAPE IMPREGNATED WITH A HARDENABLE SYNTHETIC RESIN

[75] Inventors: Joachim Scheel, Viernheim; Horst Pauler, Weinheim, both of Germany

[73] Assignee: Aktiengesellschaft, Brown, Boveri & Cie., Baden, Switzerland

[22] Filed: Jan. 25, 1972

[21] Appl. No.: 220,633

[30] Foreign Application Priority Data
Feb. 16, 1971 Germany.............................. 2107332

[52] U.S. Cl...................... 156/51, 117/232, 156/55, 156/56, 310/45, 310/217
[51] Int. Cl. ............................................ H01b 7/02
[58] Field of Search ............ 156/56, 51, 53; 30/217, 30/213, 208, 45; 174/120 SE, 121 R; 161/163, 171

[56] References Cited
UNITED STATES PATENTS

| | | | |
|---|---|---|---|
| 3,369,947 | 2/1968 | Meatens et al. ................... | 156/53 X |
| 3,162,722 | 12/1964 | Bartos............................. | 174/120 X |
| 3,525,849 | 8/1970 | Robinson et al................. | 310/217 X |
| 3,474,527 | 10/1969 | Meyer.............................. | 310/45 X |
| 3,436,815 | 4/1969 | Sheers............................... | 310/45 X |
| 3,069,302 | 12/1962 | Lewis et al............................ | 156/53 |
| 2,739,638 | 3/1956 | Lewis et al....................... | 161/163 X |
| 2,473,842 | 6/1949 | Asket............................... | 156/188 X |

FOREIGN PATENTS OR APPLICATIONS
1,032,866  6/1966  Great Britain ...................... 161/163

Primary Examiner—Alfred L. Leavitt
Assistant Examiner—David A. Simmons
Attorney, Agent, or Firm—Pierce, Scheffler & Parker

[57] ABSTRACT

A mica tape insulated electrical conductor is applied to a laminated magnetic flux carrying structure of an electric machine or other apparatus, e.g., the stator structure of a generator and is then impregnated under a vacuum with a hardenable synthetic resin which is thereafter hardened by application of heat. In order to avoid the possibility of resin leakage at a phase in the overall hardening process during which the resin passes through a thinly liquid intermediate phase before gelling sets in a thickener, e.g., colloidal silica is added. The thickener may be applied in various modes such as between the layers of mica tape on the conductor, or only under the outermost layer of tape, or between the individual laminations of the laminated structure, or between the insulated conductor and the laminations.

7 Claims, 1 Drawing Figure

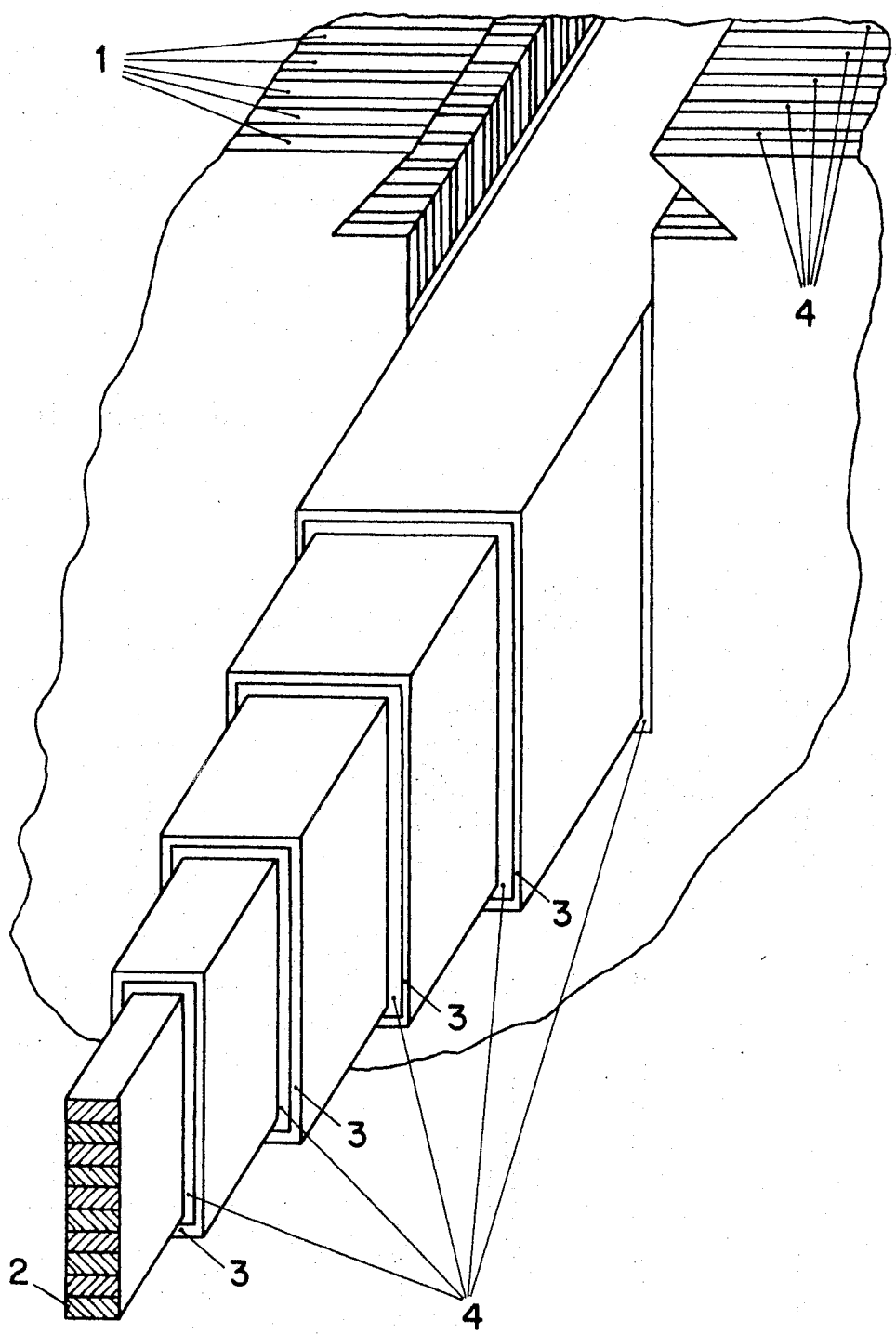

METHOD FOR INSULATING ELECTRICAL CONDUCTOR COMPONENTS OF AN ELECTRICAL APPARATUS UTILIZING MICA TAPE IMPREGNATED WITH A HARDENABLE SYNTHETIC RESIN

This invention relates to an improvement in the general method of fabricating rotary electrical machines such as generators, motors and the like, or stationary equipment, which include laminated magnetic flux carrying structures with which are associated an insulated conductor winding, the conductors which form the winding being insulated with a mica tape, and the winding after placement in the laminated structure, being impregnated with a hardenable synthetic resin and hardened.

For example, in fabricating the stator structure of large electrical machines such as generators and the like, the winding for the stator consists of suitably configured conductor bars which are insulated by winding on mica tape in several layers. The insulator conductor bars are then inserted into their proper positions within the laminated stator structure and then impregnated, in a vacuum, with the hardenable synthetic resin. During the hardening process, which is effected by application of heat, the synthetic resin passes through a thinly liquid intermediate phase before gelling actually sets in. During this phase, it is thus possible for some of the synthetic resin to run out and escape thus leading to formation of cavities within the body of the impregnated insulation which impair its electrical properties and hence reduce its life expectancy.

The general object of the present invention is to avoid this possibility of resin leakage during its thin liquid state, and the objective is attained by predisposing a thickener in the laminated structure and its associated winding prior to the impregnation step. Two suitable substances for serving as the thickener are colloidal silica and Bentonite.

In accordance with the invention, the necessary resin thickener can be applied in one or more of the following modes prior to impregnation of the conductor insulation with the heat hardenable resin which latter may, for example, be an epoxy resin or an unsaturated polyester resin.

According to one mode, the thickener can be brushed or otherwise worked in between the individual laminations of the laminated structure of the machine.

According to another mode of application, the thickener can be applied between the conductor insulation and the laminations.

Still another mode of applying the thickener is to place it between successive layers of mica tape insulation wound onto the conductor.

Also, as a variant of the latter mode, the thickener can be applied under the last, i.e., the outermost layer of mica insulating tape.

The invention will now be described in further detail in conjunction with one suitable embodiment thereof and which is illustrated in the accompanying drawing, the single view of which is a perspective cut-away section of the laminated stator of a dynamo-electric machine showing a portion of one conductor slot and the insulated electrical conductor within the slot.

With reference now to the drawing, the cut-away view of the stator shows the sheet metal laminations 1 which are stacked so as to form the body of the stator. The thickener for preventing drip-out or leaking of the resin while in its thin liquid phase during one stage of the hardening process prior to gelling, and which may be colloidal silica or Bentonite, is brushed or otherwise worked in between the individual laminations 1 and has been indicated at 4. To provide a clearly visible showing of the thickener, the layers of the thickener have been illustrated at an extremely exaggerated scale. As a matter of fact, in practice, the thickness of the layer is only a few microns. The electrical conductor in the particularly depicted slot of the stator is indicated at 2 and is seen to be provided with insulation 3 formed by winding on mica tape. In the illustrated embodiment four separate layers of this insulation are established on the conductor, and as each insulation layer is completed, the thickener 4 is brushed onto the surface. Here again the thickness of the layers 4 which is only a few microns is exaggerated to enable clear illustration.

In addition to application of the thickener 4 to the layers of insulation 3, the thickener is also seen to be applied to the surface of the conductor 2 prior to winding on the first layer of insulation, and is also applied between the outermost insulation layer and the adjacent surface portions of the conductor slot prior to insertion of the insulated conductor in the slot.

The stator structure with the conductors inserted in the winding slots and coated with the thickener as explained, is then impregnated, under vacuum, with the resin which may, for example, be one of the epoxy or unsaturated polyester type, and then hardened under the application of heat.

In conclusion, the improved method in accordance with the invention positively prevents the escape of synthetic resin during its thin liquid phase of the overall hardening process and thus prevents creation of voids which otherwise would detract from its dielectric properties and thereby assures a long life expectancy for the winding insulation.

We claim:

1. In the method of fabricating a laminated flux-carrying structure of an electrical apparatus together with a mica-tape insulated electrical conductor supported thereon and wherein said flux-carrying structure and insulated conductor are impregnated under a vacuum with a heat hardenable synthetic resin, the improvement wherein to avoid the possibility of resin leakage during that portion of the heat hardening process in which the resin passes through a thinly liquid intermediate phase before gelling sets in, the parts to be impregnated have applied thereto prior to initiating the impregnation step a substance which following contact with the impregnating resin serves to thicken it.

2. The method as defined in claim 1 wherein the pre-applied substance serving to thicken the impregnating resin is colloidal silica.

3. The method as defined in claim 1 wherein the pre-applied substance serving to thicken the impregnating resin is Bentonite.

4. The method as defined in claim 1 wherein the pre-applied substance serving to thicken the impregnating resin is applied between various overlapping layers of mica tape on the conductor.

5. The method as defined in claim 1 wherein the pre-applied substance serving to thicken the impregnating resin is applied under the outermost layer of the mica tape on the conductor.

6. The method as defined in claim 1 wherein the pre-applied substance serving to thicken the impregnating resin is applied between the individual laminations of said flux-carrying structure.

7. The method as defined in claim 1 wherein the pre-applied substance serving to thicken the impregnating resin is applied between the outermost layer of mica tape on the conductor and the adjacent surface portions of a conductor slot formed in said laminated flux-carrying structure.

* * * * *